(12) United States Patent
Topf

(10) Patent No.: US 6,813,576 B1
(45) Date of Patent: Nov. 2, 2004

(54) METHOD AND DEVICE FOR COOLING AND CALIBRATING A SECTION

(75) Inventor: Siegfried Topf, Traun (AT)

(73) Assignee: Topf Kunstsofftechnik Gesellschaft mbH, Kirchdorf (AT)

( * ) Notice: Subject to any disclaimer, the term of this patent is extended or adjusted under 35 U.S.C. 154(b) by 30 days.

(21) Appl. No.: 10/111,423

(22) PCT Filed: Nov. 4, 2000

(86) PCT No.: PCT/EP00/10892
§ 371 (c)(1),
(2), (4) Date: May 8, 2002

(87) PCT Pub. No.: WO01/34367
PCT Pub. Date: May 17, 2001

(30) Foreign Application Priority Data

Nov. 8, 1999 (DE) .......................... 199 53 704

(51) Int. Cl.⁷ .................. G01K 15/00; G01K 19/00; G06F 19/00
(52) U.S. Cl. .................. 702/99; 264/560; 510/245; 425/71; 134/57 R
(58) Field of Search .................. 702/99; 264/560; 510/245; 425/71; 134/57 R

(56) References Cited

U.S. PATENT DOCUMENTS

| | | | |
|---|---|---|---|
| 4,054,148 A | * 10/1977 | Gurr ........................ 134/57 R |
| 4,530,650 A | * 7/1985 | Milani ........................ 425/71 |
| 4,750,873 A | * 6/1988 | Loe et al. .................... 425/71 |
| 5,499,507 A | 3/1996 | Dorninger | |
| 5,514,325 A | * 5/1996 | Purstinger .................. 264/560 |
| 5,580,405 A | * 12/1996 | Palmer ...................... 156/73.1 |
| RE36,585 E | * 2/2000 | Purstinger .................. 264/560 |
| 6,187,737 B1 | * 2/2001 | Geke et al. ................. 510/245 |

FOREIGN PATENT DOCUMENTS

| | | |
|---|---|---|
| DE | 3241005 | 2/1984 |
| DE | 29521996 | 3/1999 |
| EP | 659536 | 6/1995 |
| JP | 10193437 | 7/1998 |

OTHER PUBLICATIONS

Kalibrieren und Kühlen von Rohren, Schiedrum, Plastverarbeiter 30, 1979, No. 6, pp. 322–328.

* cited by examiner

Primary Examiner—John Barlow
Assistant Examiner—Aditya Bhat
(74) Attorney, Agent, or Firm—Dennison, Schultz, Dougherty & MacDonald

(57) ABSTRACT

A method and device for cooling and calibrating a section of plastic, where the section is introduced, via a matched opening, into a preferably evacuated housing such as a tank or bath, including several panels arranged one behind the other, and treated with a cooling fluid, for example a liquid, by means of jets arranged peripherally around the section. The cooling fluid is supplied to the jets with a pressure p of $p \geq 5$ bars.

23 Claims, 2 Drawing Sheets

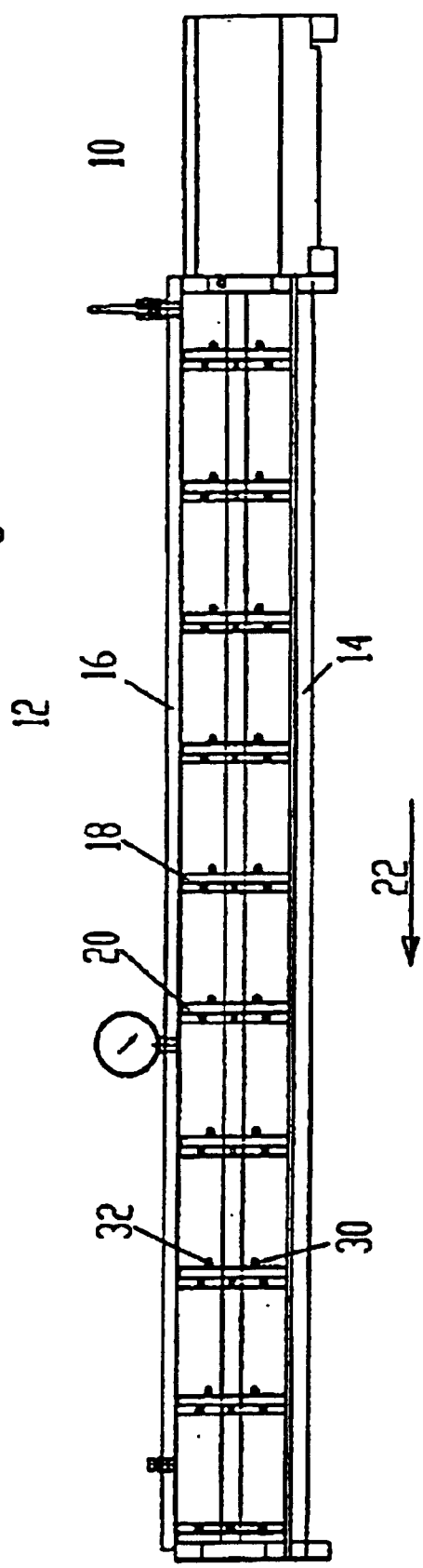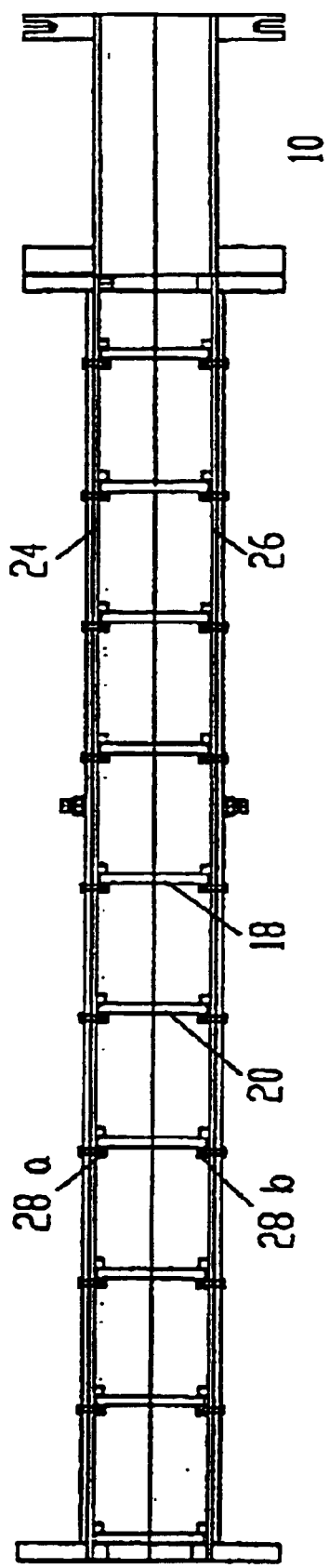

METHOD AND DEVICE FOR COOLING AND CALIBRATING A SECTION

BACKGROUND OF THE INVENTION.

The invention relates to a method for cooling and calibrating a section of plastic, where the section is introduced, via a matched opening, into a preferably evacuated housing such as a tank or bath, comprising several panels arranged one behind the other, and treated with a cooling medium, for example a liquid, by means of jets arranged peripherally around the section. The invention further relates to a device for cooling and calibrating a section made of plastic, comprising an elongated and preferably evacuatable housing such as a bath or tank, in which several panels are arranged one behind the other each with an opening matching the section or its outer contour and through which the section can be introduced, as well as several jets arranged along the transport path of the section and applying a cooling medium, for example a liquid, to the section.

To cool and calibrate a section of plastic coming from an extruder or extrusion die, the section can first pass along a vacuum drying calibration area and then be cooled using cooling liquid, with calibration taking place at the same time.

For cooling and calibration, full bath and spray bath devices are known. In the case of full bath cooling, the section is passed through a tank filled with water. With spray bath cooling, the section is sprayed on all sides with water, this water being sprayed with an absolute pressure between 2 and 4 bars using jets which can have a diameter of 1 mm or more. The jets themselves are preferably formed by slots provided in tubes extending along the transport path of the section.

Even if spray bath cooling permits an intensive and even cooling of the sections even in areas with undercuts, it entails considerable drawbacks, in particular due to the high water consumption. For that reason, full bath cooling has been employed with increasing frequency recently, as described for example in EP 0 659 536 B1, in DE 295 21 996 U1 or in general terms in the literature DE-Z: *Plastverarbeiter*, 30. *Jahrgang*, 1979, No. 6, p. 322–328. However, full bath cooling has the drawback that when the liquid is added surges can arise that can lead to an undesirable deformation of the sections to be cooled and calibrated. In the case of vacuum calibration, fluctuations in the vacuum occur in addition, as a result of which the section to be cooled and calibrated in the full bath might also undergo unwelcome geometry changes.

From DE 32 41 005 A1, a method and a device are known for cooling hollow sections whereby from the start of every extrusion operation water is conveyed into the interior of the hollow section with a pressure between 2.5 and 4 bars, and compressed air with a pressure between 4.5 and 6 bars, hence achieving a micro-fine distribution of the water over the inner surface of the section in order to achieve cooling.

In a device for calibrating extruded sections made of plastic in accordance with DE 34 27 277 A1, hollow sections are passed through a bath having spray jets arranged in the area of its four corners, via which jets the cooling liquid is applied to the section.

Here the bath can be designed as a closed box and evacuated in order to prevent unwelcome deformation of the section.

SUMMARY OF THE INVENTION

The problem underlying the present invention is to develop a method and a device of the type mentioned at the outset in such a way that the advantages of both spray bath cooling and full bath cooling are achieved while avoiding all their drawbacks.

In accordance with the invention, the method proposed for a solution to the problem is substantially for the cooling medium to be supplied with a pressure p of $p \geq 5$ bars to the jet, which in particular has a passage opening for the medium with a diameter d of $d \leq 0.7$ mm. In particular, the pressure of the cooling medium, for example a liquid, is 10 bars or more compared with the atmospheric pressure and the diameter of the jet is less than 0.5 mm. With these parameters, comprehensive spraying can take place of the section to be cooled and calibrated, without the high water consumption otherwise necessary in spray bath devices. Instead, the water required for facilities of equal dimensions is even less than with the full bath method. For example, comparative measurements have shown that with the same dimensions and throughput in a facility using the full bath method, twice as much water is needed in comparison with cooling in accordance with the invention. In the case of a spray bath cooling system also with the same dimensions and to the prior art, where the liquid is sprayed with a pressure of between 1–3 bars above atmospheric pressure, the water consumption is even 3 to 4 times higher.

In a further embodiment of the invention, it is proposed that the liquid be sprayed by the jets in such a way that an opening spray angle $\alpha$ transverse to the longitudinal direction of the section of $70° \leq \alpha \leq 90°$ is obtained, in particular $75° \leq \alpha \leq 85°$. This ensures that the section is sprayed peripherally to the required extent and cooled evenly. The latter is ensured in particular by the fact that—unlike with full bath cooling—an accumulation of air bubbles on the surface of the section is ruled out, as a result of which bubbles the necessary heat dissipation in these areas would not otherwise be assured. In addition, the water used for cooling is always fresh, an advantage which full bath cooling obviously cannot offer. Instead of fresh water, water collected in the bath, which can be passed through a cooling circuit, can also be used.

For intensive and even cooling, it is further provided that at least one jet each is arranged in the area of each corner of a square surrounding the section and is aligned on the section in such a way that normal lines extending from the passage openings of the jets arranged in the corners intersect in an area which is also intersected by a straight line on which lie the respective center points of the panels arranged one behind the other.

The invention further provides that the liquid is sprayed through three jets arranged in straight lines running vertically along opposite sides of the section and/or through two jets arranged in straight lines running horizontally along opposite sides of the section. Naturally the vertical arrangement and the horizontal one can be changed over and/or three jets arranged along each side, for example.

A device of the type mentioned at the outset is distinguished in that the jet has an opening with a maximum diameter d of $d \leq 0.7$ mm and is connected to a liquid supply in which the liquid is under a pressure p of $p \geq 5$ bars. In particular, the opening of the jet has a maximum diameter d of $d \leq 0.5$ mm. The jet can in particular be a hole-type jet, if necessary however also a slot-type jet with a slot running transversely to the longitudinal axis of the section.

The liquid itself is in particular subjected to a pressure p of $p \geq 10$ bars. It is furthermore provided that the jet is designed such that its maximum spraying angle $\alpha$ is $70° \leq \alpha \leq 90°$, in particular $75° \leq \alpha \leq 85°$, where the sides of the spray angle or cone are aligned on adjacent surfaces of an imaginary square section.

In particular, it is provided that in each case a jet is arranged in one corner of an imaginary rectangle surrounding the section. In addition, a further jet can be provided in the central areas of vertically running edges of a rectangle.

The panels themselves can rest in a known way on supporting gibs extending from opposite walls of the housing in the transport direction of the section, with jets being integrated into said supporting gibs. Alternatively, it is possible to arrange the panels between in particular cylindrical holding elements such as pin-like journals extending from opposite walls of the housing, with at least some of the holding elements incorporating a jet.

BRIEF DESCRIPTION OF THE DRAWINGS

Further details, advantages and features of the invention are shown not only in the claims and in the features they contain—singly and/or in combination—but also in the following description of a preferred embodiment shown in the drawing.

The drawing shows in

FIG. 1 a device of an extruding facility for cooling and calibrating a section in a side view, FIG. 2 the device in accordance with FIG. 1 in a plan view, and FIG. 3 a cross-section through the device in accordance with FIGS. 1 and 2 in an enlarged view.

DESCRIPTION OF THE PREFERRED EMBODIMENTS

Figure 3:
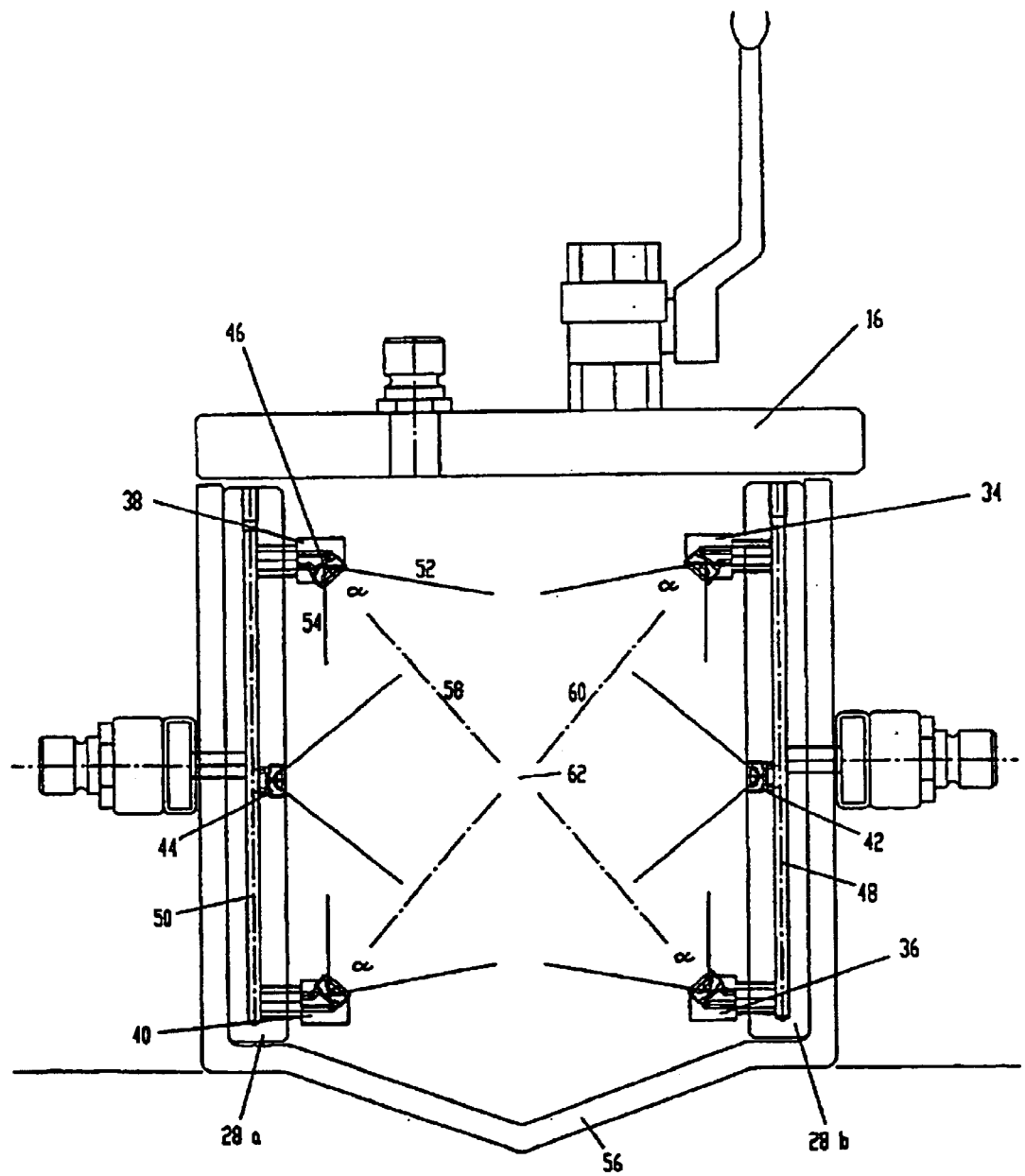

In the figures, sections though an extruding facility are shown, using which sections of plastic with the required geometry, such as hollow-chamber sections, tubes or other elongated elements of required cross-section geometry are manufactured. The plastic section coming out of an extrusion jet, not shown, can here first be passed to a dry calibration system 10 such as a vacuum calibration system, followed by a vacuum calibration system using the spraying technique (device 12). The device 12 comprises an elongated housing such as a bath 14 closable using a cover 16. Inside the bath 14, panels 18, 20 are arranged with a specified pitch and in turn have passage openings whose geometries match the outer contour of the section to be cooled and calibrated. To that extent however, reference is being made to technologies that are sufficiently known. The panels 20 are in particular mounted in floating form, where the panels 18, 20 in the transport direction (arrow 22) of the section are in contact with supporting gibs 28*a*, 28*b* extending from opposite side walls 24, 26 of the bath 14. On the opposite side of the panels 18, 20, pin-like holding elements 30, 32 are provided. Instead of supporting gibs and holding elements, groove-like slots can also be provided in the walls 24, 26 for receiving the panels.

To ensure that the section passing through the bath 14 is cooled intensively and evenly to the required extent, the section is treated, for example sprayed, with cooling medium, in particular such as liquid. To do so, six jets 34, 36, 38, 40, 42, 44 are provided, arranged in one plane, with the plane running transverse to the longitudinal axis of the section. Of course the jets 34, 36, 38, 40, 42, 44 can also be arranged in planes running offset to one another, without departing from the invention. The crucial factor is however that the jets 34, 36, 38, 40, 42, 44 have outlet openings 46 whose maximum diameter is less that 0.7 mm, in particular less than 0.5 mm. In particular, the jets 34, 36, 38, 40, 42, 44 are hole-type jets. Furthermore, it is provided in accordance with the invention that the liquid supplied via the supply lines 48, 50 to the jets 34, 36, 38, 40, 42, 44 is under a pressure of more than 5 bars above atmospheric pressure, in particular around 10 bars above atmospheric pressure. This ensures that the liquid is sprayed finely and in adequate quantity via the jets 34, 36, 38, 40, 42, 44, with the opening cone or angle of the jets 34, 36, 38, 40, 42, 44 being designed such that the sections passing through the panels 18, 20 are evenly sprayed peripherally, so that intensive and even cooling is achieved in undercuts too—an advantage that is not always achievable during full bath cooling in particular. Furthermore, it is assured by the spraying technology that no air bubbles—as in the full bath method—can collect, as a result of which bubbles the necessary heat dissipation in these areas would otherwise not be achieved.

As the drawing in FIG. 3 makes clear, one jet 34, 36, 38, 40 is arranged in each corner of an imaginary square surrounding the section. In addition, a further jet, in this embodiment the jet 42 or 44, is arranged in the central area of a longitudinal edge of the square.

At least the jets 34, 36, 38, 40, in the corner areas should be designed such that the respective opening angle $\alpha$, limited by the sides 52, 54, of the liquid to be sprayed is in the range between 70° and 90°, in particular in the area of 80°. Here the limits of the liquid to be sprayed are aligned on the section to be cooled in such as way that they pass along adjacent sides of an imaginary square section.

Furthermore, normal lines 58, 60 extend from the jets 34, 36, 38, 40 and intersect in a line 62 in which lie the center points of the panels 18, 20.

As the sectional view in FIG. 3 makes clear, the jets 34, 36, 38, 40, 42, 44 extend from the supporting gibs 28*a*, 28*b* of the panels 18, 20. The former accordingly perform a dual function. It goes without saying that the jets can also extend from separate holders on the bath 14 or be integrated into the pin-like holding elements 30, 32.

the bath 14 has a bottom 56 formed with a V-shaped cross-section and forming a drainage channel for the sprayed liquid. This ensures that no liquid can collect in the bath 14 to the extent that the jets 36, 40 on the bottom are covered and hence not operable.

If vacuum calibration takes place, a pressure reduced by 0.01–0.1 bar compared with atmospheric pressure should prevail in the bath or tank 14.

What is claimed is:

1. A method for cooling and calibrating an extruded plastic section comprising introducing said section via a matched opening into a housing containing a plurality of sequential panels for calibrating the plastic section, and spraying the plastic section with a cooling fluid by means of a plurality of jets arranged peripherally around the plastic section, the cooling fluid being supplied to the jets with a pressure $p \geq 5$ bars, wherein:

the cooling medium is sprayed by the jets such that a spray angle $\alpha$ of $70° < \alpha < 90°$ transverse to the longitudinal direction of the section is obtained, or at least one jet each is arranged in the area of each corner of a square surrounding the section and is aligned with the section such that normal lines extending from the passage openings of the jets arranged in the corners intersect in an area which is also intersected by a straight line on which lie the respective center points of the panels arranged one behind the other, or the cooling medium is sprayed by three jets arranged in straight lines running vertically along opposite sides of the section and/or through two jets arranged in straight lines running horizontally along opposite sides of the section.

2. Method according to claim 1, wherein the housing is evacuated.

3. Method according to claim 1, wherein the cooling fluid is a liquid.

4. Method according to claim 1, wherein $p \geq 10$ bars.

5. Method according to claim 1, wherein the jets have a diameter $d \leq 0.7$ mm.

6. Method according to claim 5, wherein $d \leq 0.5$ mm.

7. Method according to claim 1, wherein the cooling medium is sprayed by the jets such that a spray angle $\alpha$ of $70° \leq \alpha \leq 90°$ transverse to the longitudinal direction of the section is obtained.

8. Method according to claim 1, wherein $75° \leq \alpha \leq 85°$.

9. Method according to claim 1, wherein at least one jet each is arranged in the area of each corner of a square surrounding the section and is aligned with the section such that normal lines extending from the passage openings of the jets arranged in the corners intersect in an area which is also intersected by a straight line on which lie the respective center points of the panels arranged one behind the other.

10. Method according to claim 1, wherein the cooling medium is sprayed by three jets arranged in straight lines running vertically along opposite sides of the section and/or through two jets arranged in straight lines running horizontally along opposite sides of the section.

11. Device for cooling and calibrating an extruded plastic section, comprising a housing containing a plurality of sequential panels including an opening matching the outer geometry of the plastic section and through which the plastic section may pass, a plurality of hole-type jets, slot-type jets, jets designed such that a spraying angle $\alpha$ transverse to the section is $70° < \alpha < 90°$, or jets where one of said jets is arranged in one corner of an imaginary rectangle surrounding the section, arranged along a path for transport of the plastic section through the housing for applying a cooling fluid to the housing, optionally means for evacuating the housing, wherein:

the jets have an opening diameter $d \leq 0.7$ mm and/or means are provided for supplying the cooling medium through the jets a pressure $p \geq 5$ bars.

12. Device according to claim 11, wherein the jets have an opening diameter $d \leq 0.5$ mm.

13. Device according to claim 11, wherein the jets are hole-type jets.

14. Device according to claim 11, wherein the jets are slot-type jets.

15. Device according to claim 11, wherein means are provided for supplying the cooling medium at a pressure $p \geq 10$ bars.

16. Device according to claim 11, wherein the jets are designed such that a spraying angle $\alpha$ transverse to the section is $70° \leq \alpha \leq 90°$.

17. Device according to claim 16, wherein $75° \leq \alpha \leq 85°$.

18. Device according to claim 11, wherein one of said jets is arranged in one corner of an imaginary rectangle surrounding the section.

19. Device according to claim 18, additionally comprising a jet arranged in a central area of vertically running edges of the rectangle.

20. Device according to claim 18, wherein a jet is arranged in at least one corner of a square covers with its opening a plane whose normal line intersects a straight line on which lie the respective center points of the sequential panels.

21. Device for cooling and calibrating an extruded plastic section, comprising a housing containing a plurality of sequential panels including an opening matching the outer geometry of the plastic section and through which the plastic section may pass, a plurality of jets arranged along a path for transport of the plastic section through the housing for applying a cooling fluid to the housing, optionally means for evacuating the housing, wherein:

the panels are in contact with supporting gibs extending from opposite side walls of the housing, with said jets being integrated into said supporting gibs, or the panels are in contact with cylindrical holding elements extending from opposite walls the housing, with at least some of the holding elements having a jet, and wherein the jets have an opening diameter $d \leq 0.7$ mm and/or means are provided for supplying the cooling medium through the jets a pressure $p \geq 5$ bars.

22. Device according to claim 21, wherein the panels are in contact with supporting gibs extending from opposite side walls of the housing, with said jets being integrated into said supporting gibs.

23. Device according to claim 21, wherein the panels are in contact with cylindrical holding elements extending from opposite walls the housing, with at least some of the holding elements having a jet.

* * * * *